Jan. 27, 1931.  F. W. E. RICHARDS  1,790,557
LIGHTING APPARATUS
Filed June 19, 1929
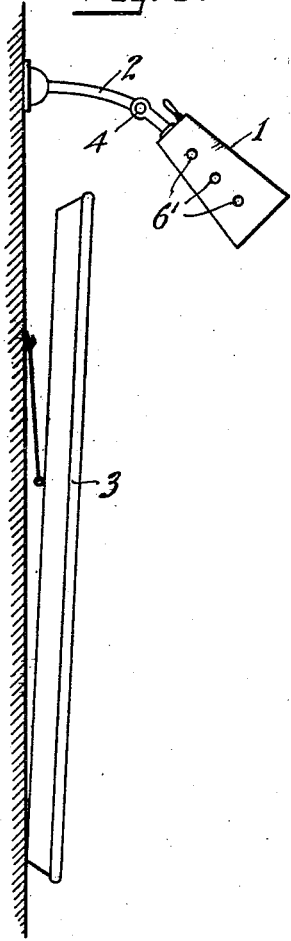
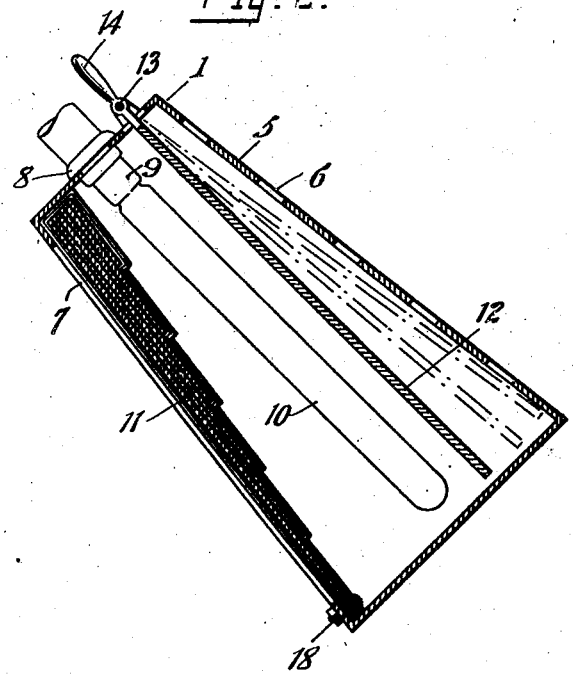
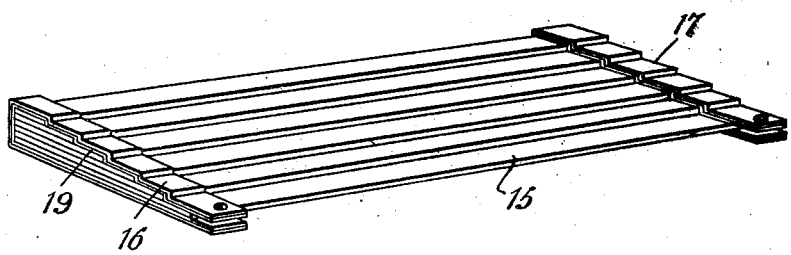
INVENTOR
Florence W. E. Richards
BY
ATTORNEYS
WITNESSES Patented Jan. 27, 1931

1,790,557

UNITED STATES PATENT OFFICE

FLORENCE W. E. RICHARDS, OF NEW YORK, N. Y.

LIGHTING APPARATUS

Application filed June 19, 1929. Serial No. 372,186.

This invention relates to a lighting apparatus, and has for an object to provide an improved construction wherein the light is diffused and disseminated in such a manner as to substantially evenly illuminate one or more objects located in proper relation thereto.

Another object of the invention is to provide a lighting apparatus adapted to be used in churches, theatres, art galleries, homes and elsewhere, for illuminating pictures, statuary and other objects, so that a full value of the object will be presented.

A further object, more specifically, is to provide a lighting apparatus wherein a source of light is arranged in connection with the diffusing member and with a reflector which may be stationary or adjustable for causing the light to be directed in a certain direction.

In the accompanying drawings,—

Figure 1 is a side view of a picture and lighting apparatus disclosing an embodiment of the invention, the picture and lighting apparatus being shown connected to a wall with the lighting apparatus positioned to illuminate the picture;

Figure 2 is an enlarged vertical, longitudinal, sectional view through the lighting apparatus shown in Figure 1;

Figure 3 is a perspective view of the light diffusing member shown in Figure 2.

Referring to the accompanying drawings by numerals, 1 indicates a lighting apparatus disclosing an embodiment of the invention, said apparatus being supported by suitable bracket 2, so that the light from the apparatus 1 may fall properly on the picture 3. From Figure 1 it will be noted that the bracket 2 is provided with a hinge or articulated portion 4, whereby the apparatus 1 may be swung upwardly or downwardly in order to properly direct the light upon the picture 3 or other object to be illuminated. In Figure 2 a longitudinal, vertical sectional view is shown on an enlarged scale. From this view it will be seen that the apparatus 1 is provided with a casing 5 having suitable air vents 6. Preferably this casing is closed, except for the air vents 6, the large bottom opening 7 and the opening 8 through which the lamp socket 9 extends. Preferably a long electric lamp 10 is supported by socket 9 so as to give proper illumination substantially from one end to the other of casing 5. If preferred, other forms of lamps may be used without departing from the spirit of the invention, though this construction of lamp has been found most desirable, because of its more or less even distribution of light to the light-diffusing member 11. A reflector 12 is arranged on the opposite side of lamp 10, said reflector being a properly treated metal reflector, a mirror or any suitable reflector which will reflect or deflect the light toward member 11. In order to cause the rays of light to be deflected properly, the reflector 12 is pivotally mounted at 13 and held in different, adjusted positions by friction, though positive locks may be used, if desired. A handle 14 is connected to the reflector 12, whereby the reflector may be readily swung back and forth until it assumes the correct position. The reflector not only acts in the capacity of a reflector, but acts to prevent an appreciable amount of light from passing through the upper ventilating openings 6. As shown in Figure 1, the ventilating openings 6' are on the side, and where these are objectionable they may be closed, because the ventilating openings 6 are sufficient for most purposes.

In illuminating different objects it has been found difficult to provide a proper illumination to make the different parts of the article stand out. In the present invention means have been provided for directing light to a desired object, and to so diffuse the light that the object will be properly illuminated, and thereby present full value to the colors or other important details in the article. In illuminating pictures, statuary and other objects difficulty has been experienced to prevent undesirable shadows and objectionable glares. By providing the light-diffusing member 11 a proper amount of light is secured, and this light is so distributed and diffused that all parts of a picture or other object are correctly illuminated, so that a person may fully realize or grasp the beauties thereof when standing at different positions in front of the picture. The diffusing member 11 is preferably formed from a number of sheets 15, said sheets being glass having a frosted surface. Each sheet is frosted and preferably the frosted side is uppermost or toward the lamp 10, as shown particularly in Figure 3. The various sheets or plates of glass 15 overlap and are held in position by suitable clamping end members 16 and 17. If desired, a bolt 18 may be used to clamp these end members in place and also to clamp the same to part of frame 5.

From Figure 2 it will be seen that the thickest part of the member 11 is the part nearest to the picture 3 and also nearest to the lamp 10. In this way the additional light is retarded, or rather, diffused so that the upper part of the picture will receive the same illumination as the lower part, and also the same as the lateral portions of the picture. It will, of course, be understood that the member 11 is made of a proper size and is positioned a proper distance from the picture to direct the light over the entire picture. The various plates 15 being of glass and frosted permit a certain amount of light to pass therethrough, said light being resisted more and more from the lower edge to the upper edge of the device. In order to hold the various plates 15 properly in place, members 16 and 17 are preferably formed of metal and are each preferably lined with a rubber coating 19, whereby they may properly grip the various plates 15 to clamp them firmly in place without injury.

What I claim is:—

1. A lighting apparatus for pictures and the like, including a light-diffusing member formed of a plurality of contacting sheets of glass superposed with the plates being of less width from the bottom to the top, and each plate on each surface being frosted to have the same translucence, and a source of light positioned to direct rays of light through said diffusing member toward said picture.

2. A lighting apparatus for illuminating pictures and the like, comprising, a diffusing member formed thicker at one edge than at the other with successive reductions in thickness at predetermined distances, whereby there will be a greater retardation of light at one edge than the other, and a source of light positioned to project rays of light through said diffusing member toward said picture.

3. A lighting apparatus for illuminating pictures and the like, comprising a diffusing glass member formed of frosted superposed contacting glass plates, a source of light for projecting rays of light through said diffusing member onto said picture, said member including a plurality of glass plates, the respective plates being of different sizes and diffusing light over different areas and cushion means for clamping said plates together.

4. A light diffusing apparatus for illuminating a picture and the like, comprising a light diffusing body formed of plates having the characteristic of frosted glass plates, each plate having the same degree of translucence, said plates being of different widths whereby a stepped formation is presented with the thickest portion of the body near one edge and the thinnest portion near the opposite edge, means for clamping said plates together, a source of light positioned to shine through said body, and means for mounting said source of light and said body so that the light striking said picture at the top portion will pass through the thickest part of said body, and the light striking the bottom portion of said picture will pass through the thinnest part of said body.

5. A light diffusing apparatus comprising a plurality of identically frosted superposed contacting glass plates positioned in stepped formation with the widest plate at one side and the narrowest plate at the opposite side, and means for rigidly clamping said plates together.

6. A lighting apparatus including a substantially opaque casing having an opening, a light diffusing member positioned in said opening, and a lamp in the casing positioned to shine through said light diffusing member, said light diffusing member consisting of a plurality of glass plates of the same thickness and length and of different widths arranged in a stepped formation, each of said plates being frosted on one surface and with the frosting identical on all plates.

7. A light diffusing member consisting of a plurality of identically frosted plates of different widths and of the same length and the same thickness, said plates being superposed and in contact with each other for their entire surfaces, the plates being arranged with the widest plate on one side of the group and the narrowest plate on the other side of the group with one edge of the superposed plates set back to produce a stepped formation.

Signed at New York, in the county of New York and State of New York, this 17th day of June, A. D. 1929.

FLORENCE W. E. RICHARDS.